US011997465B2

(12) United States Patent
Yang et al.

(10) Patent No.: US 11,997,465 B2
(45) Date of Patent: May 28, 2024

(54) SPEAKER DEVICE

(71) Applicant: AAC Microtech (Changzhou) Co., Ltd., Changzhou (CN)

(72) Inventors: Huhu Yang, Shenzhen (CN); Wei Wei, Shenzhen (CN); Zhaoyu Yin, Shenzhen (CN); Zhizhu Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 205 days.

(21) Appl. No.: 17/839,436

(22) Filed: Jun. 13, 2022

(65) Prior Publication Data

US 2023/0217177 A1 Jul. 6, 2023

(30) Foreign Application Priority Data

Dec. 30, 2021 (CN) ......................... 202123437991.4

(51) Int. Cl.

| | |
|---|---|
| ***H04R 7/16*** | (2006.01) |
| ***H04R 1/28*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ........... *H04R 9/025* (2013.01); *H04R 1/2803* (2013.01); *H04R 7/16* (2013.01); *H04R 9/045* (2013.01); *H04R 9/06* (2013.01); *H04R 2400/11* (2013.01)

(58) Field of Classification Search

CPC ........ H04R 9/025; H04R 1/2803; H04R 7/16; H04R 9/045; H04R 9/06; H04R 2400/11

See application file for complete search history.

(56) References Cited

U.S. PATENT DOCUMENTS

| | | | | |
|---|---|---|---|---|
| 2017/0094399 | A1* | 3/2017 | Chandramohan | H04R 5/033 |
| 2019/0261078 | A1* | 8/2019 | Ouchi | H04R 1/1016 |
| 2022/0400338 | A1* | 12/2022 | Silver | H04R 1/02 |

* cited by examiner

*Primary Examiner* — Suhan Ni

(74) *Attorney, Agent, or Firm* — W&G Law Group

(57) ABSTRACT

A speaker device is provided. The speaker device includes a frame, a vibration unit and a magnetic circuit unit. The vibration unit and the magnetic circuit unit are fixed to the frame. The magnetic circuit unit is configured to drive the vibration unit to vibrate to produce sound. The magnetic circuit unit includes a yoke. The yoke and the frame are spaced to form a leakage port. The vibration unit includes a diaphragm, a voice coil, and an elastic support assembly. The auxiliary diaphragm has one end fixed to the frame and the other end connected to the voice coil. The auxiliary diaphragm is provided with multiple vents spaced and penetrating the auxiliary diaphragm. The present disclosure can increase the circulation of gases above and below the auxiliary diaphragm, so that a side leakage effect of the speaker device is improved, thereby improving acoustic performance of the speaker device.

10 Claims, 7 Drawing Sheets

SPEAKER DEVICE

TECHNICAL FIELD

The present disclosure relates to the field of electroacoustic conversion, and in particular, to a speaker device applied to portable electronic products.

BACKGROUND

A speaker device mainly includes a frame, a vibration unit fixed to the frame, and a magnetic circuit unit having a magnetic gap and configured to drive the vibration unit to vibrate to produce sound. The frame, the vibration unit, and the magnetic circuit unit enclose a sound-producing inner cavity jointly.

The magnetic circuit unit includes a yoke fixed to a side of the frame away from the vibration unit. The yoke and the frame are spaced to form a side leakage port of the speaker device. The leakage port communicates with the sound-producing inner cavity.

The vibration unit includes a diaphragm fixed to the frame, a voice coil inserted in the magnetic gap and driving the diaphragm to vibrate to produce sound, and an elastic support assembly fixed to the frame and connected to the voice coil. The elastic support assembly includes an auxiliary diaphragm located at the leakage port. The auxiliary diaphragm and the yoke are spaced and enclose a leakage passage jointly.

Due to a limited height of the speaker device in the related art, a side leakage height thereof is small, and only a space for vibration is left on the auxiliary diaphragm. As a result, gas circulation is not smooth, and acoustic performance of the speaker device is seriously affected.

SUMMARY

An objective of the present disclosure is to provide a speaker device with smooth gas circulation and a good side leakage effect so as to improve acoustic performance.

In order to achieve the above objective, an aspect of the present disclosure provides a speaker device. The speaker device includes a frame, a vibration unit and a magnetic circuit unit. The vibration unit and the magnetic circuit unit are fixed to the frame, and the magnetic circuit unit has a magnetic gap and is configured to drive the vibration unit to vibrate to produce sound. The magnetic circuit unit comprises a yoke fixed to a side of the frame away from the vibration unit, the yoke and the frame are spaced along a vibration direction of a diaphragm to form a leakage port for leaking from a side surface of the speaker device. The frame, the vibration unit and the magnetic circuit unit jointly enclose to form a sound-producing inner cavity, and the sound-producing inner cavity communicates with the leakage port. The vibration unit comprises a diaphragm fixed to the frame, a voice coil inserted in the magnetic gap and driving the diaphragm to vibrate to produce sound, and an elastic support assembly. The elastic support assembly comprises an auxiliary diaphragm located at the leakage port. The auxiliary diaphragm and the yoke are spaced along the vibration direction and jointly enclose to form a leakage passage. The auxiliary diaphragm has one end fixed to the frame and the other end connected to the voice coil. The auxiliary diaphragm is provided with a plurality of vents spaced and penetrating the auxiliary diaphragm. The plurality of vents is configured to communicate the sound-producing inner cavity with the leakage port.

As an improvement, the plurality of vents is arranged in multiple rows on the auxiliary diaphragm, and two adjacent rows of the plurality of vents are parallel to each other.

As an improvement, the multiple rows of vents are equally spaced.

As an improvement, the plurality of vents in each one of the multiple rows is equally spaced.

As an improvement, the auxiliary diaphragm comprises an auxiliary suspension having an arc cross-section, a first auxiliary connecting portion and a second auxiliary connecting portion, the first auxiliary connecting portion and the second auxiliary connecting portion are formed by bending and extending two opposite sides of the auxiliary suspension, respectively, the first auxiliary connecting portion is fixed to a side of the frame away from the diaphragm, the second auxiliary connecting portion is fixed to a side of the voice coil away from the diaphragm, and the plurality of vents is arranged on the auxiliary suspension.

As an improvement, the elastic support assembly further comprises an elastic member, the elastic member has one end fixed to the frame and the other end fixed to the voice coil, the auxiliary diaphragm is fixed to a side of the elastic member away from the diaphragm, the auxiliary suspension is spaced from the elastic member, and a plurality of recessing portions is formed by recessing inward from a side of the auxiliary suspension close to the elastic member.

As an improvement, the plurality of recessing portions is formed in two rows on the auxiliary suspension and arranged as a curve, and the plurality of vents is arranged between two adjacent recessing portions in each row of the recessing portions.

As an improvement, the elastic member comprises a first elastic fixing arm, a second elastic fixing arm and an elastic connecting arm, the first elastic fixing arm is fixed to the frame, the second elastic fixing arm is connected to the voice coil and is spaced from the first elastic fixing arm, the elastic connecting arm is configured to connect the first elastic fixing arm and the second elastic fixing arm, the first auxiliary connecting portion is bonded to the first elastic fixing arm, the second auxiliary connecting portion is bonded to the first second elastic fixing arm, and the auxiliary suspension and the elastic connecting arm are spaced from and are opposite to each other.

As an improvement, the vibration unit further comprises a skeleton fixed to the diaphragm, the skeleton comprises a skeleton body having an annular shape, a first skeleton connecting portion formed by bending and extending from an inner periphery of the skeleton body toward the diaphragm, and a second skeleton connecting portion formed by bending and extending from an outer periphery of the skeleton body toward a direction away from the diaphragm, the skeleton body is fixed to a side of the voice coil close to the diaphragm, the first skeleton connecting portion extends to the diaphragm and is fixedly connected to the diaphragm, and the second skeleton connecting portion extends to the elastic member and is connected to the elastic member.

As an improvement, four elastic support assemblies are provided and are arranged at four corners of the frame.

Compared with the related art, according to the speaker device in the present disclosure, vents are provided on the auxiliary diaphragm, so that the circulation of gases above and below the auxiliary diaphragm is increased, and a side leakage effect of the speaker device is improved, thereby improving the acoustic performance of the speaker device.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF REFERENCE NUMERALS

100: speaker device; 110: sound-producing inner cavity; 120: leakage port; 130: leakage passage; 1: frame; 2: vibration unit; 21: diaphragm; 211: vibration portion; 212: suspension; 213: fixing portion; 214: opening; 215: dome; 22: voice coil; 23: elastic support assembly; 231: elastic member; 2311: first elastic fixing arm; 2312: second elastic fixing arm; 2313: elastic connecting arm; 232: auxiliary diaphragm; 2321: auxiliary suspension; 2322: first auxiliary connecting portion; 2323: second auxiliary connecting portion; 233: vent; 234: recessing portion; 24: skeleton; 241: skeleton body; 242: first skeleton connecting portion; 243: second skeleton connecting portion; 3: magnetic circuit unit; 30: magnetic gap; 31: yoke; 32: main magnet; 33: pole core; 34: auxiliary magnet.

DESCRIPTION OF EMBODIMENTS

The technical solutions of the present disclosure will be described clearly and completely below with reference to the accompanying drawings of the present disclosure. The described embodiments are merely a part, rather than all of the embodiments of the present disclosure. All other embodiments obtained by those skilled in the art without creative efforts based on the embodiments of the present disclosure shall fall within the protection scope of the present disclosure.

Figure 1:
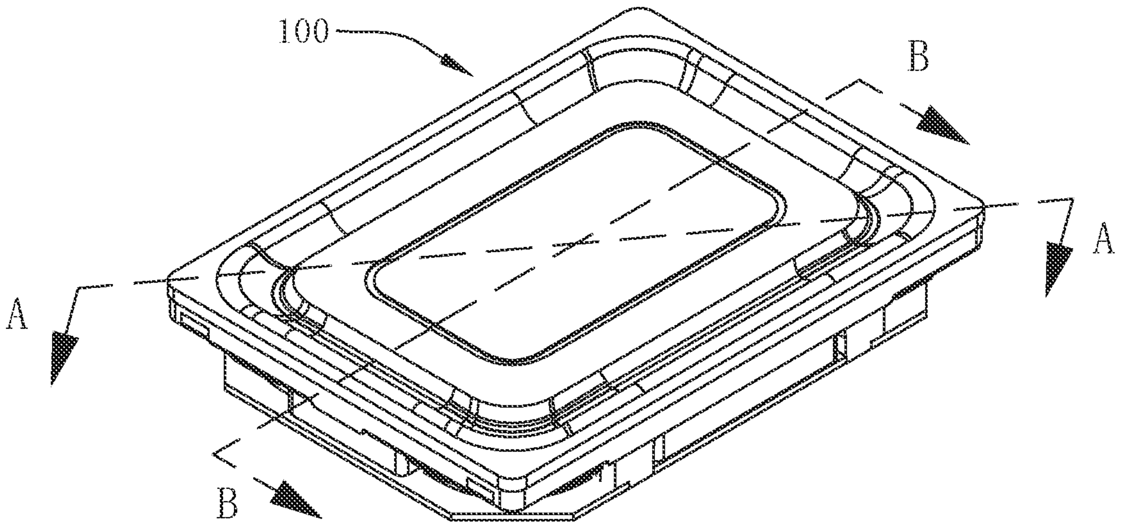
FIG. 1 is a perspective diagram of a speaker device according to an embodiment of the present disclosure.
Figure 2:
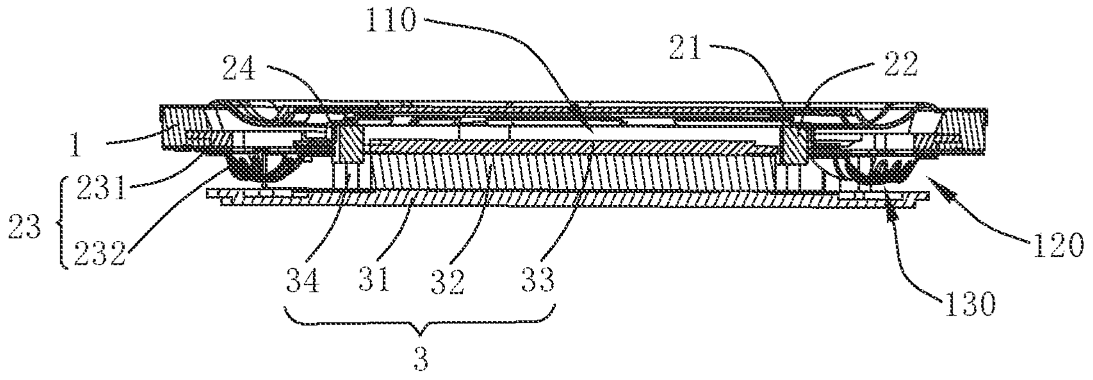
FIG. 2 is a cross-sectional view taken along a line A-A in FIG. 1 according to an embodiment of the present disclosure.
Figure 3:
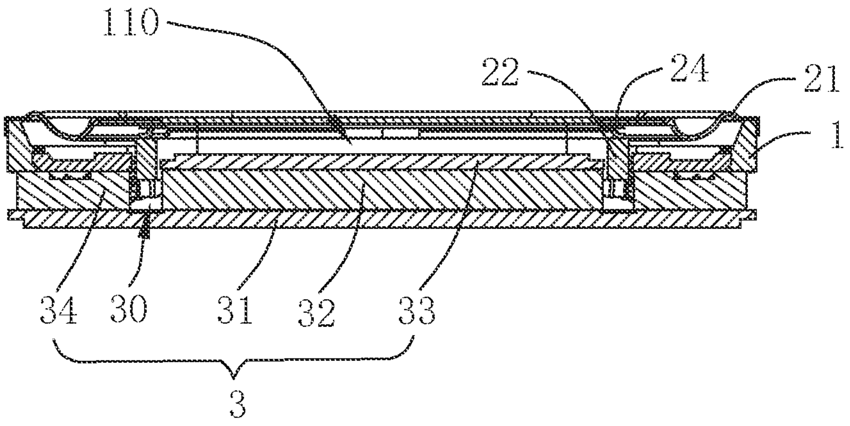
FIG. 3 is a cross-sectional view taken along a line B-B in FIG. 1 according to an embodiment of the present disclosure.
Figure 4:
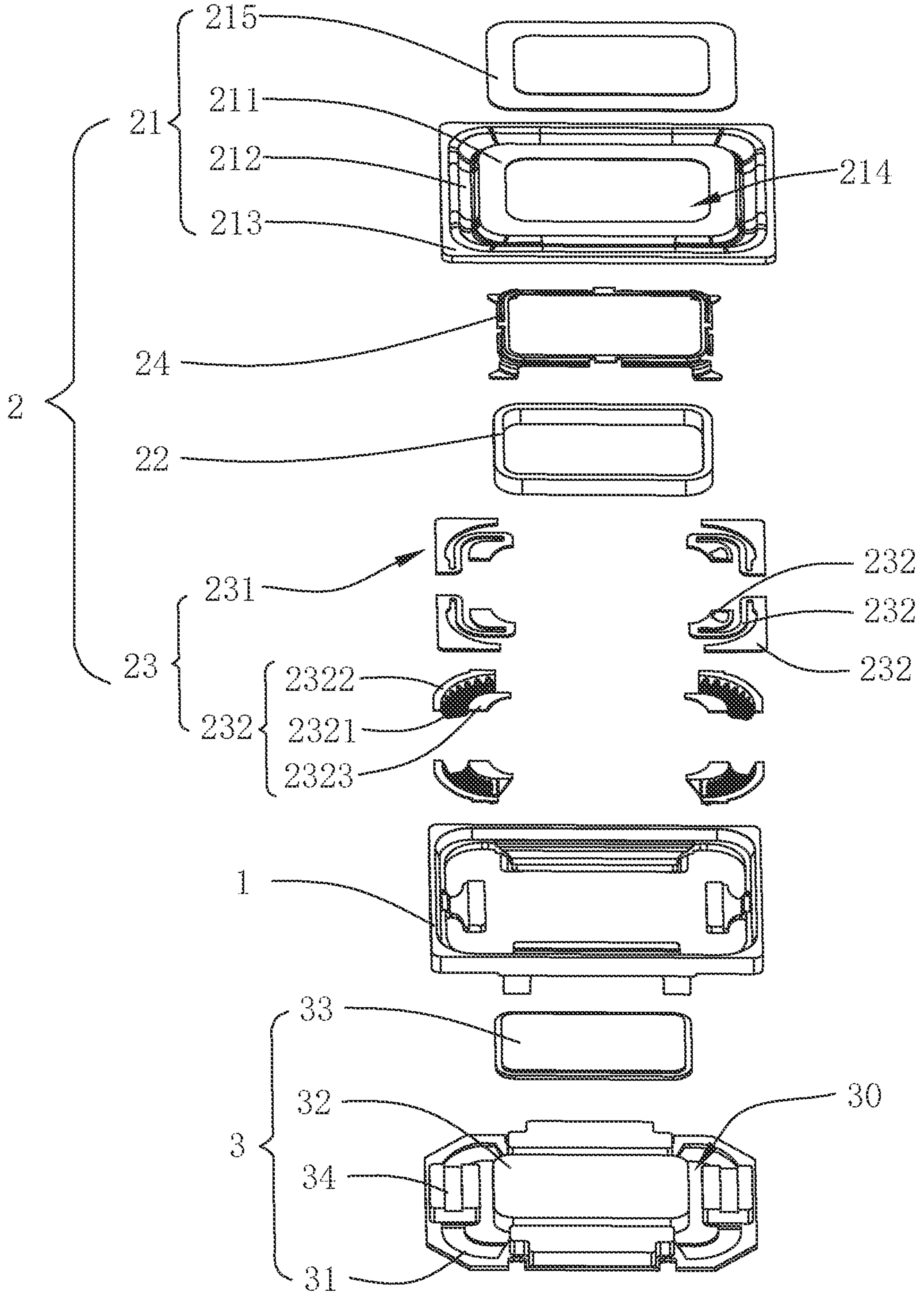
FIG. 4 is an exploded view of a speaker device according to an embodiment of the present disclosure.
Figure 5:
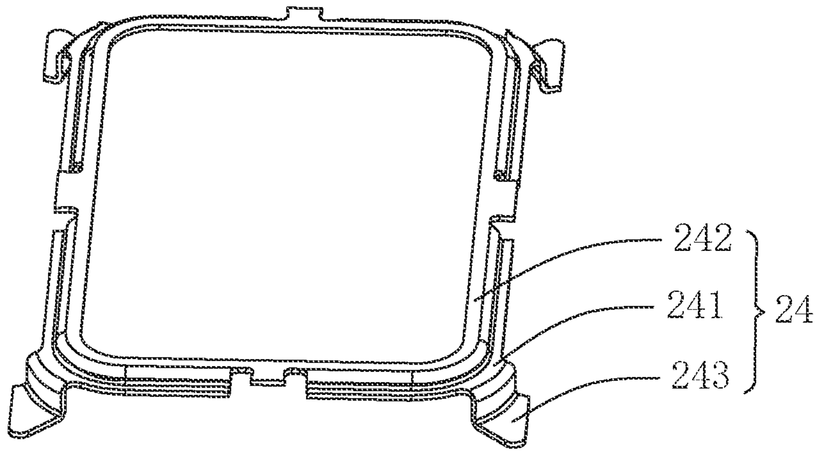
FIG. 5 is a structural schematic diagram of a skeleton of a speaker device according to an embodiment of the present disclosure.
Figure 6:
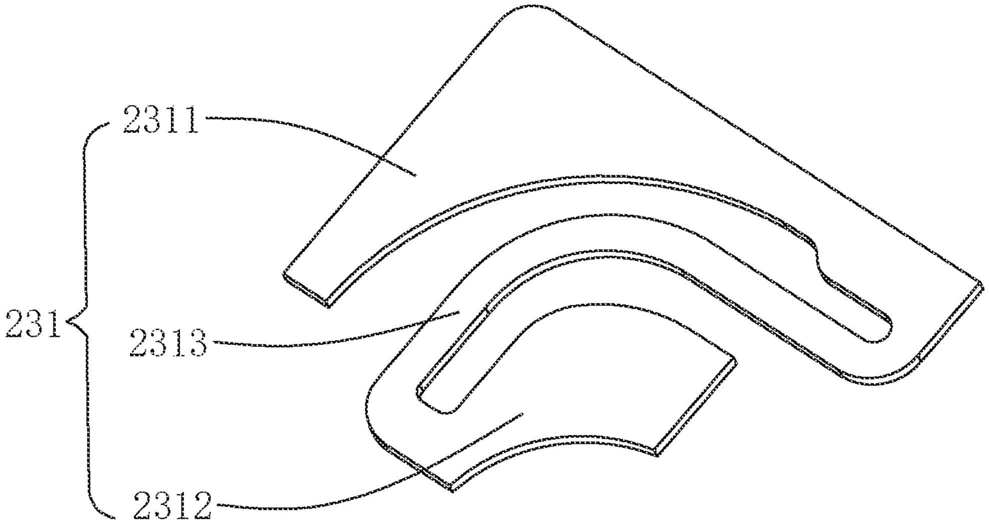
FIG. 6 is a structural schematic diagram of an elastic member of a speaker device according to an embodiment of the present disclosure.
Figure 7:
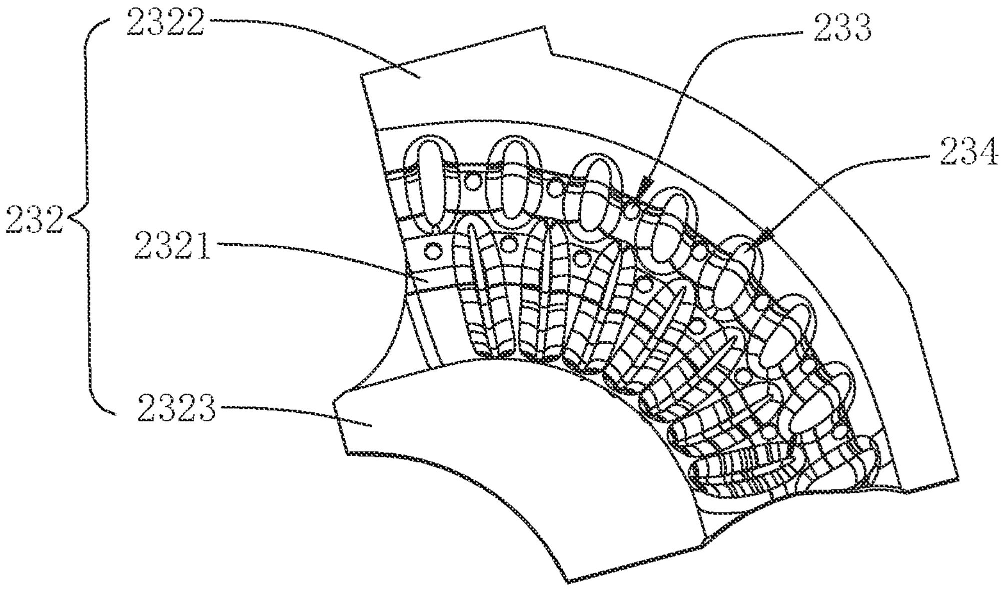
FIG. 7 is a structural schematic diagram of an auxiliary diaphragm of a speaker device according to an embodiment of the present disclosure.

The present disclosure provides a speaker device 100. As shown in FIG. 1 to FIG. 7, the speaker device 100 includes a frame 1, a vibration unit 2 fixed to the frame 1, and a magnetic circuit unit 3 having a magnetic gap 30. The magnetic circuit unit 3 is configured to drive the vibration unit 2 to vibrate to produce sound.

In an embodiment, the vibration unit 2 includes a diaphragm 21 fixed to the frame 1, a voice coil 22, an elastic support assembly 23, and a skeleton 24. The voice coil 22 is inserted in the magnetic gap 30 and configured to drive the diaphragm 21 to vibrate to produce sound.

In an embodiment, the diaphragm 21 includes a vibration portion 211, a suspension 212 bending and extending from a periphery of the vibration portion 211, and a fixing portion 213 extending from the suspension 212 toward the frame 1.

In an embodiment, the diaphragm 21 further includes a dome 215. An opening is provided in a middle region of the vibration portion 211. The dome 215 is bonded to the vibration portion 211 and completely covers the opening 214.

In an embodiment, the elastic support assembly 23 further includes an elastic member 231 and an auxiliary diaphragm 232. The elastic member 231 has one end fixed to the frame 1 and the other end fixed to the voice coil 22. The auxiliary diaphragm 232 is fixed to a side of the elastic member 231 away from the diaphragm 21.

Optionally, the elastic member 231 is an integrated structure having conductive wires on an elastic structure, or a conductive flexible printed circuit board (FPCB), to lead conductive wires for the voice coil 22. At this time, the elastic member 231 is electrically connected directly or indirectly to the voice coil 22.

In an embodiment, the elastic member 231 includes a first elastic fixing arm 2311, a second elastic fixing arm 2312, and an elastic connecting arm 2313. The first elastic fixing arm 2311 is fixed to the frame 1. The second elastic fixing arm 2312 is connected to the voice coil 22 and spaced from the first elastic fixing arm 2311. The elastic connecting arm 2313 is configured to connect the first elastic fixing arm 2311 and the second elastic fixing arm 2312.

In an embodiment, the auxiliary diaphragm 232 is provided with multiple spaced vents 233 penetrating the auxiliary diaphragm 232. In this way, gases above and below the auxiliary diaphragm 232 can circulate so as to improve a side leakage height of the speaker device 100.

The vents 233 may be arranged prior to or subsequent to molding the auxiliary diaphragm 232.

In an embodiment, the vents 233 are arranged in multiple rows on the auxiliary diaphragm 232. Two adjacent rows of the vents 233 are parallel to each other.

The multiple rows of vents 233 are equally spaced. Multiple vents 233 in each row are equally spaced. In this way, all gases above and below the auxiliary diaphragm 232 can circulate so as to improve a side leakage height of the speaker device 100.

In an embodiment, the vents 233 are circular holes, which may certainly be designed in other shapes according to actual requirements, such as oval holes or square holes.

In an embodiment, the auxiliary diaphragm 232 includes an auxiliary suspension 2321 with an arc cross-section, a first auxiliary connecting portion 2322 and a second auxiliary connecting portion 2323. The first auxiliary connecting portion 2322 and the second auxiliary connecting portion 2323 are formed by bending and extending two opposite sides of the auxiliary suspension 2321, respectively. Each of the first auxiliary connecting portion 2322 and the second auxiliary connecting portion 2323 is fixed to a side of the elastic member 231 away from the diaphragm 21. The vents 233 are arranged on the auxiliary suspension 2321.

The first auxiliary connecting portion 2322 is bonded to the first elastic fixing arm 2311. The second auxiliary connecting portion 2323 is bonded to the second elastic fixing arm 2312. The auxiliary suspension 2321 and the elastic connecting arm 2313 are spaced opposite to each other.

In an embodiment, multiple recessing portions 234 are formed by recessing inward from a side of the auxiliary suspension 2321 close to the elastic member 231, so that a space between the auxiliary diaphragm 232 and the elastic member 231 is increased, thereby improving the acoustic performance of the speaker device 100.

In an embodiment, the recessing portions 234 are formed in two rows on the auxiliary suspension 2321 and arranged as a curve, and the plurality of vents 233 are arranged between two adjacent recessing portions 234 in each row of the recessing portions 234. That is, the vents 233 are also formed in two rows and arranged as a curve.

In an embodiment, the vibration unit 2 further includes a skeleton 24 fixed to the diaphragm 21. The skeleton 24 includes an annular skeleton body 241, a first skeleton connecting portion 242 formed by bending and extending from an inner periphery of the skeleton body 241 toward the diaphragm 21, and a second skeleton connecting portion 243 formed by bending and extending from an outer periphery of the skeleton body 241 to a direction away from the diaphragm 21. The skeleton body 241 is fixed to one side of the voice coil 22 close to the diaphragm 21. The first skeleton connecting portion 242 extends to the diaphragm 21 and is fixedly connected to the diaphragm 21. The second skeleton connecting portion 243 extends to the elastic member 231 and is connected to the elastic member 231.

The skeleton body 241 is as a curve fixed to the voice coil 22, and forms an electrical connection with the voice coil 22.

In an embodiment, the elastic member 231 is an FPCB. The second skeleton connecting portion 243 extends to the second elastic fixing arm 2312 of the elastic member 231 and is electrically connected to the second elastic fixing arm 2312. That is, the second elastic fixing arm 2312 forms indirectly an electrical connection with the voice coil 22 through the skeleton 24.

In an embodiment, four elastic support assemblies 23 are arranged at four corners of the frame 1, respectively. That is, the frame 1 is of a rectangular structure. The elastic member 231 in one elastic support assembly 23 may form an electrical connection with the voice coil 22 to lead out a conductive circuit for the voice coil 22.

In an embodiment, the magnetic circuit unit 3 includes a yoke 31 fixed to the frame 1, a main magnet 32 stacked on a side of the yoke 31 close to the diaphragm 21, a pole core 33 stacked on a side of the main magnet 32 close to the diaphragm 21, and at least two auxiliary magnets 34. The at least two auxiliary magnets 34 are stacked on a side of the yoke 31 close to the diaphragm 21 and spaced from the main magnet 32 to form the magnetic gap 30.

In an embodiment, four auxiliary magnets 34 are provided and are arranged around the main magnet 32 correspondingly in pairs.

The yoke 31 and the frame 1 are spaced along a vibration direction of the diaphragm 21 to form a leakage port 120 to leak from a side surface of the speaker device 100. The frame 1, the vibration unit 2 and the magnetic circuit unit 3 jointly enclose to form a sound-producing inner cavity 110. The sound-producing inner cavity 110 communicates with the leakage port 120.

The auxiliary diaphragm 232 and the yoke 31 are spaced along the vibration direction of the diaphragm 21 and jointly enclose to form a leakage passage 130, and the vents 233 of the auxiliary diaphragm 232 are configured to communicate the sound-producing inner cavity 110 with the leakage port 120, so as to relieve the pressure of the speaker device 100 and achieve the acoustic performance.

In use, gases in the sound-producing inner cavity 110 can further flow toward the leakage passage 130 through the vents 233 of the auxiliary diaphragm 232 so as to be discharged from the leakage port 120, thereby improving the side leakage effect of the speaker device 100.

Compared with the related art, in the speaker device 100 according to the present disclosure, multiple vents 233 are provided on the auxiliary diaphragm 232, so that the circulation of gas above and below the auxiliary diaphragm 232 is increased and a side leakage effect of the speaker device 100 is improved, thereby improving the acoustic performance of the speaker device 100.

The above are only embodiments of the present disclosure. It should be pointed out herein that, for those skilled in the art, improvements can also be made without departing from the concept of the present disclosure, all of which fall within the protection scope of the present disclosure.

What is claimed is:

1. A speaker device, comprising a frame, a vibration unit and a magnetic circuit unit, wherein the vibration unit and the magnetic circuit unit are fixed to the frame, and the magnetic circuit unit has a magnetic gap and is configured to drive the vibration unit to vibrate to produce sound;

the magnetic circuit unit comprises a yoke fixed to a side of the frame away from the vibration unit, the yoke and the frame are spaced along a vibration direction of a diaphragm to form a leakage port for leaking from a side surface of the speaker device;

the frame, the vibration unit and the magnetic circuit unit jointly enclose to form a sound-producing inner cavity, and the sound-producing inner cavity communicates with the leakage port;

the vibration unit comprises a diaphragm fixed to the frame, a voice coil inserted in the magnetic gap and driving the diaphragm to vibrate to produce sound, and an elastic support assembly; and the elastic support assembly comprises an auxiliary diaphragm located at the leakage port, the auxiliary diaphragm and the yoke are spaced along the vibration direction and jointly enclose to form a leakage passage, the auxiliary diaphragm has one end fixed to the frame and the other end connected to the voice coil, the auxiliary diaphragm is provided with a plurality of vents spaced and penetrating the auxiliary diaphragm, and the plurality of vents is configured to communicate the sound-producing inner cavity with the leakage port.

2. The speaker device as described in claim 1, wherein the plurality of vents is arranged in multiple rows on the auxiliary diaphragm, and two adjacent rows of the plurality of vents are parallel to each other.

3. The speaker device as described in claim 2, wherein the multiple rows of vents are equally spaced.

4. The speaker device as described in claim 2, wherein the plurality of vents in each one of the multiple rows is equally spaced.

5. The speaker device as described in claim 1, wherein the auxiliary diaphragm comprises an auxiliary suspension having an arc cross-section, a first auxiliary connecting portion and a second auxiliary connecting portion, the first auxiliary connecting portion and the second auxiliary connecting portion are formed by bending and extending two opposite sides of the auxiliary suspension, respectively, the first auxiliary connecting portion is fixed to a side of the frame away from the diaphragm, the second auxiliary connecting portion is fixed to a side of the voice coil away from the diaphragm, and the plurality of vents is arranged on the auxiliary suspension.

6. The speaker device as described in claim 5, wherein the elastic support assembly further comprises an elastic member, the elastic member has one end fixed to the frame and the other end fixed to the voice coil, the auxiliary diaphragm is fixed to a side of the elastic member away from the diaphragm, the auxiliary suspension is spaced from the elastic member, and a plurality of recessing portions is formed by recessing inward from a side of the auxiliary suspension close to the elastic member.

7. The speaker device as described in claim 6, wherein the plurality of recessing portions is formed in two rows on the auxiliary suspension and arranged as a curve, and the plurality of vents is arranged between two adjacent recessing portions in each row of the recessing portions.

8. The speaker device as described in claim 6, wherein the elastic member comprises a first elastic fixing arm, a second elastic fixing arm and an elastic connecting arm, the first elastic fixing arm is fixed to the frame, the second elastic fixing arm is connected to the voice coil and is spaced from the first elastic fixing arm, the elastic connecting arm is configured to connect the first elastic fixing arm and the second elastic fixing arm, the first auxiliary connecting portion is bonded to the first elastic fixing arm, the second auxiliary connecting portion is bonded to the first second elastic fixing arm, and the auxiliary suspension and the elastic connecting arm are spaced from and are opposite to each other.

9. The speaker device as described in claim 6, wherein the vibration unit further comprises a skeleton fixed to the diaphragm, the skeleton comprises a skeleton body having an annular shape, a first skeleton connecting portion formed by bending and extending from an inner periphery of the skeleton body toward the diaphragm, and a second skeleton connecting portion formed by bending and extending from an outer periphery of the skeleton body toward a direction away from the diaphragm, the skeleton body is fixed to a side of the voice coil close to the diaphragm, the first skeleton connecting portion extends to the diaphragm and is fixedly connected to the diaphragm, and the second skeleton connecting portion extends to the elastic member and is connected to the elastic member.

10. The speaker device as described in claim 1, wherein four elastic support assemblies are provided and are arranged at four corners of the frame.

* * * * *